(12) United States Patent
Krishnan et al.

(10) Patent No.: US 7,774,710 B2
(45) Date of Patent: Aug. 10, 2010

(54) AUTOMATIC SHARING OF ONLINE RESOURCES IN A MULTI-USER COMPUTER SYSTEM

(75) Inventors: Kalyanaraman Krishnan, Vellore (IN); Bhaskar Reddy Yasa, Bangalore (IN); Satish Ramaiah, Bangalore (IN)

(73) Assignee: SAP AG, Walldorf (DE)

( * ) Notice: Subject to any disclaimer, the term of this patent is extended or adjusted under 35 U.S.C. 154(b) by 435 days.

(21) Appl. No.: 11/318,616

(22) Filed: Dec. 28, 2005

(65) Prior Publication Data

US 2007/0150551 A1    Jun. 28, 2007

(51) Int. Cl.
*G06F 3/00* (2006.01)
(52) U.S. Cl. .................... 715/751; 715/748
(58) Field of Classification Search .......... 715/751, 715/748
See application file for complete search history.

(56) References Cited

U.S. PATENT DOCUMENTS

| | | | | |
|---|---|---|---|---|
| 6,564,246 | B1 * | 5/2003 | Varma et al. | 709/205 |
| 6,801,227 | B2 * | 10/2004 | Bocionek et al. | 715/777 |
| 7,197,502 | B2 * | 3/2007 | Feinsmith | 707/100 |
| 2002/0026478 | A1 * | 2/2002 | Rodgers et al. | 709/205 |
| 2002/0129106 | A1 * | 9/2002 | Gutfreund | 709/205 |
| 2003/0126136 | A1 * | 7/2003 | Omoigui | 707/10 |
| 2004/0078448 | A1 * | 4/2004 | Malik et al. | 709/206 |

* cited by examiner

*Primary Examiner*—Doug Hutton
*Assistant Examiner*—Soumya Dasgupta
(74) *Attorney, Agent, or Firm*—Kenyon & Kenyon LLP

(57) ABSTRACT

A software tool assists users of a computer network to share items from each others' personal workspaces without requiring manual interaction on the users' part to receive and store items therein. An authoring user enters a command to share the object with "target recipients" and identifies the target recipients. Thereafter, the computer system creates records corresponding to the shared object in the workspaces of the target recipients. The records include pointers to the shared object. When a target recipient elects to open the records, it causes the computer system to access the author's workspace and create a copy of the personal object for the target recipient, who is then free to interact with the copy as if it were in his own personal workspace. Significantly, the target recipient does not participate in the distribution of the personal object from the author's workspace to his own. There is no administrative overhead as is required commonly in e-mail distribution systems.

14 Claims, 4 Drawing Sheets

300

400

AUTOMATIC SHARING OF ONLINE RESOURCES IN A MULTI-USER COMPUTER SYSTEM

BACKGROUND

The present invention relates to sharing of online resources in a multi-user computer system and, in particular, to a system that automatically distributes knowledge-based objects without requiring use of traditional groupware applications such as e-mail.

Modern businesses use networked computer systems in many facets of their operation to simplify and streamline business processes. SAP AG markets several applications to assist businesses in their knowledge management functions, customer relationship management functions, and supply chain management functions (among others). Other vendors provide, for example, groupware applications to permit business operators to manage contacts, record tasks, schedule meetings and communicate via e-mail. Still other vendors offer applications that assist operators to store documents and other work product in integrated document management systems, where the work product can be indexed for later search and retrieval. In all of these applications, operators may record the businesses' day-to-day operations.

Some applications permit operators to record personal notes and store them for later use. The Lotus Notes personal journal and Microsoft Outlook notes are examples of this use. Some systems permit the notes to be drafted as a free text note pad while others include fields such as title, author and perhaps client code that permit the note to be indexed in some fashion. In all of these systems, the notes typically are stored in a single user's workspace and are not shared with others without an express command.

Existing applications permit a user (herein, an "author") to exchange his personal notes with other users. In the most common method, the author simply e-mails the personal note to others. While this method is straightforward, it can be expensive to administer. Each recipient of a shared note must review the note personally and save it in his own workspace. This process becomes oppressive when a large number of notes are shared among large teams and it can become annoying if a user is forced to administer to a large number of shared notes are not relevant to a user's practice. Accordingly, there is a need in the art for members of a common network to share work product with one another automatically, in a manner that frees users from having to manage the work product manually.

DETAILED DESCRIPTION

Embodiments of the present invention work cooperatively with existing applications to publish personal objects automatically to other operators. To publish a personal object, an author may open a previously existing object or create one anew. The author enters a command to share the object with others (the "target recipients") and identifies the target recipients. Thereafter, the computer system creates records corresponding to the shared object in the workspaces of the target recipients. The records include pointers to the shared object. When a target recipient elects to open the records, it causes the computer system to access the author's workspace and create a copy of the personal object for the target recipient, who is then free to interact with the copy as if it were in his own personal workspace. Alternatively, the system may open the object directly if appropriate permissions are set by the author. Significantly, the target recipient does not participate in the distribution of the personal object from the author's workspace to his own. There is no administrative overhead as is required in e-mail distribution systems.

Figure 1:
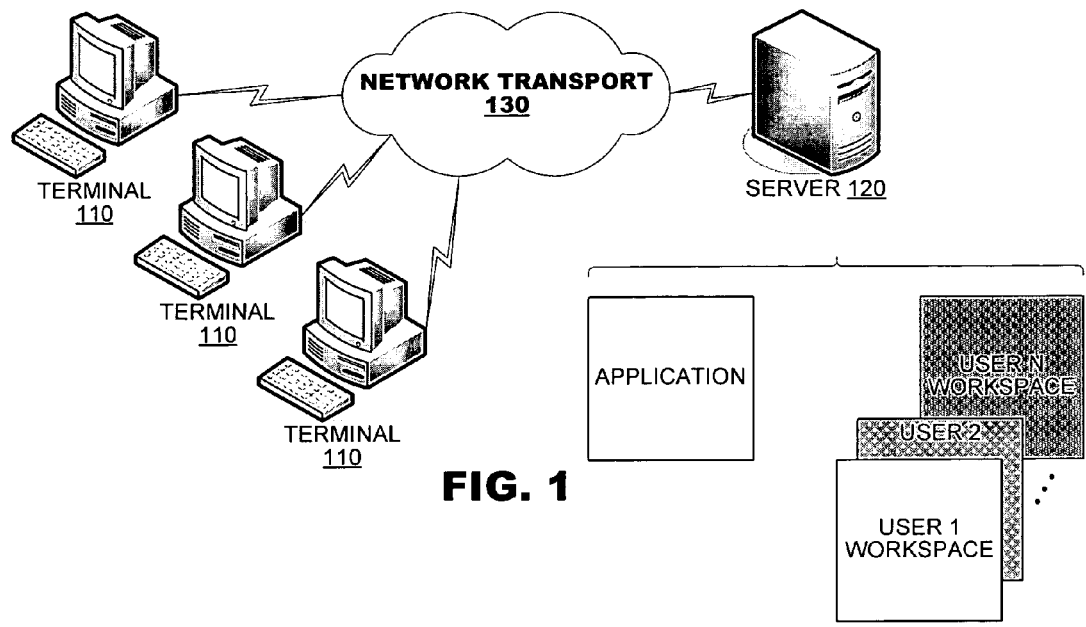
FIG. 1 is a simplified block diagram of a computer network suitable for use with the present invention.

FIG. 1 is a simplified block diagram of a computer system 100 suitable for use with the present invention. The system 100 may include a number of terminals 110 connected to one or more servers 120 via a network 130. The terminals 110 and servers 120 collectively execute a number of applications, which include executable code and various data sets. For example, the application may assign each user its own workspace, which is maintained separate from other workspaces of other users. Various users also may operate on common, shared data during execution of application but this functionality it not shown in FIG. 1. The present discussion focuses on sharing of data objects that normally reside in a workspace of a single user.

As noted, FIG. 1 is a simplified block diagram of a computer system 100. Unless noted otherwise, the topology and architecture of the system 100 is immaterial to the present discussion unless otherwise noted.

Figure 2:
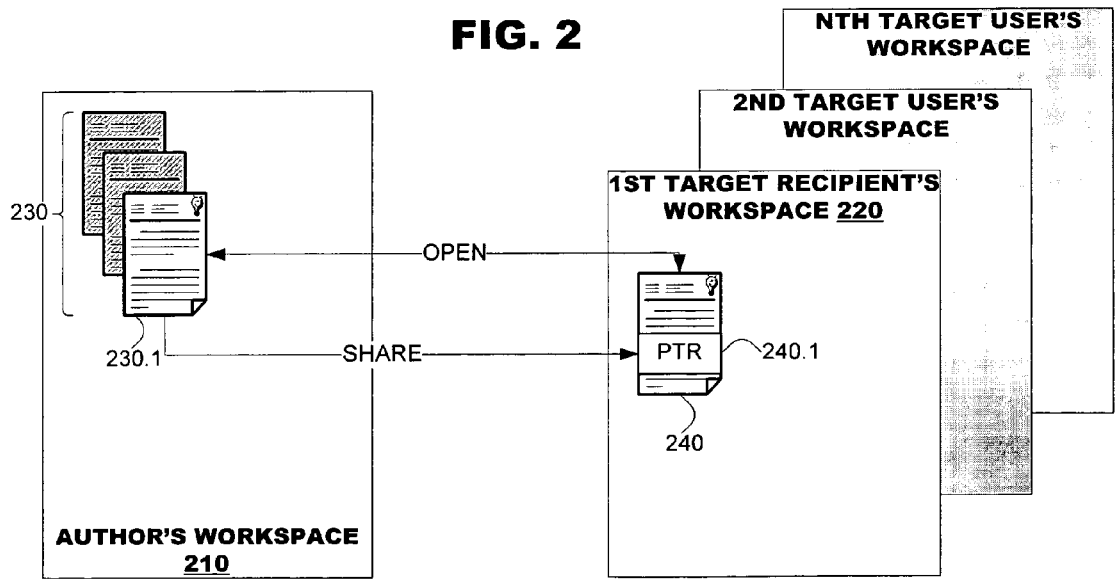
FIG. 2 is a data flow diagram illustrating operation of an embodiment of the present invention.

FIG. 2 is a flow diagram of communication flow among the workspaces of various users. For convenience, FIG. 2 illustrates an author's workspace 210 and a $1^{st}$ recipient's workspace 220 but the principles of the present invention may be extended to multiple recipient works paces (shown in phantom) as may be desired. FIG. 2 illustrates several personal objects 230 included within the author's workspace 210. In the example of FIG. 2, the author selects one of the personal objects 230.1 for distribution to others.

When the author elects to share a personal object and identifies the target recipient(s) for the object, the computer system creates a personal object record 240 in the recipient's workspace 220 (represented by the line labeled "share"). The personal object record 240 may be stored in the target recipient's workspace 220 in the same manner as if it were an object authored locally by the target recipient (e.g., generated wholly within the target recipient's workspace). Additionally, it may be presented in the application as if it were generated locally. Within the personal object record 240, the record stores a pointer representing a location within the author's workspace 210 where the data of the record may be found.

When a target recipient elects to open the shared personal object 240, the computer system opens the object 240 and determines that it is a shared object. Using the pointer 240.1 embedded in the object copy, the system retrieves data from the original shared object 230.1, creates a copy and presents it to the target recipient through the application. Thus, if the original object 230.1 were modified or updated at any point between the time that the shared copy 240 was created in the target recipients workspace 220 and the time that it is opened, such updates would be retrieved at the time the object is opened.

The principles of the present invention may be extended to a variety of different types of personal objects. The personal objects may be groupware objects such as personal journal entries or notes generated through the Lotus or Microsoft suite of groupware applications. They may be documents, image files or multimedia files that are stored in connection with authoring tools. Further, they may be files stored in personal workspace areas of a computer system's filespace. The principles of the present invention extend to almost any files or records that are created by computer system users and stored in personal workspaces. The computer instructions for performing the exemplary method can be stored on a computer readable medium that, when executed by a terminal, cause the terminal to execute the instruction.

Figure 3:
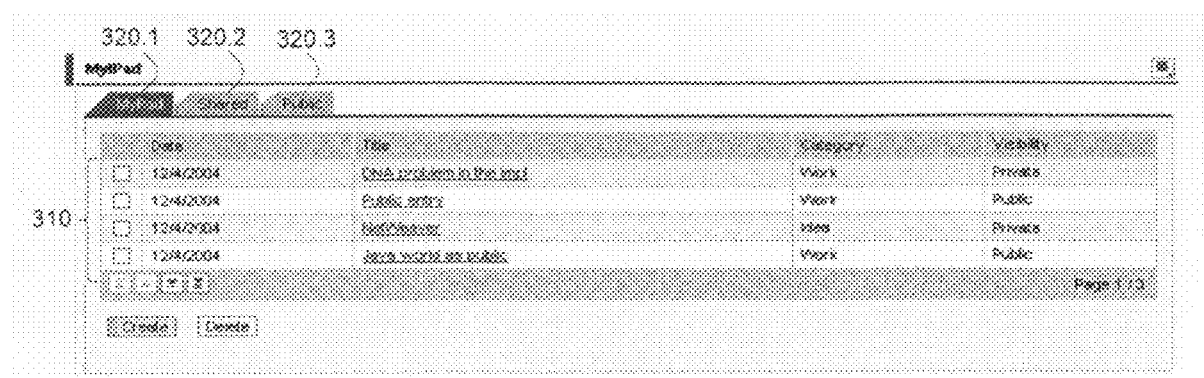
FIGS. 3-6 are screen shots illustrating operation of embodiments of the present invention.

FIG. 3 is a screen shot of a user interface 300 for use in a Knowledge Management application. FIG. 3 illustrates operation of a notes tool, called "IPAD" for convenience. There, the user interface presents a plurality of records 310 in a main area of the display. The user interface also includes a plurality of navigation tabs 320.1-320.3 to permit an operator to navigate to different records 310. In this embodiment, the user interface presents locally-generated records 310 in a first panel of the display, records that are being shared with the user in a second panel of the display accessed via tab 320.2 and records that are shared with all users (public records) in the third panel of the display 300 accessed via a third tab 320.3.

Figure 4:
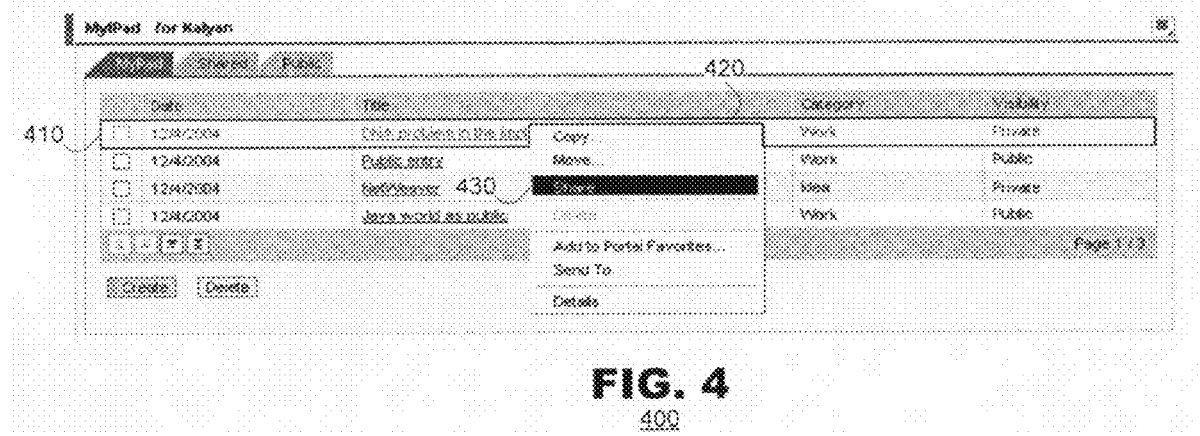
Figure 5:
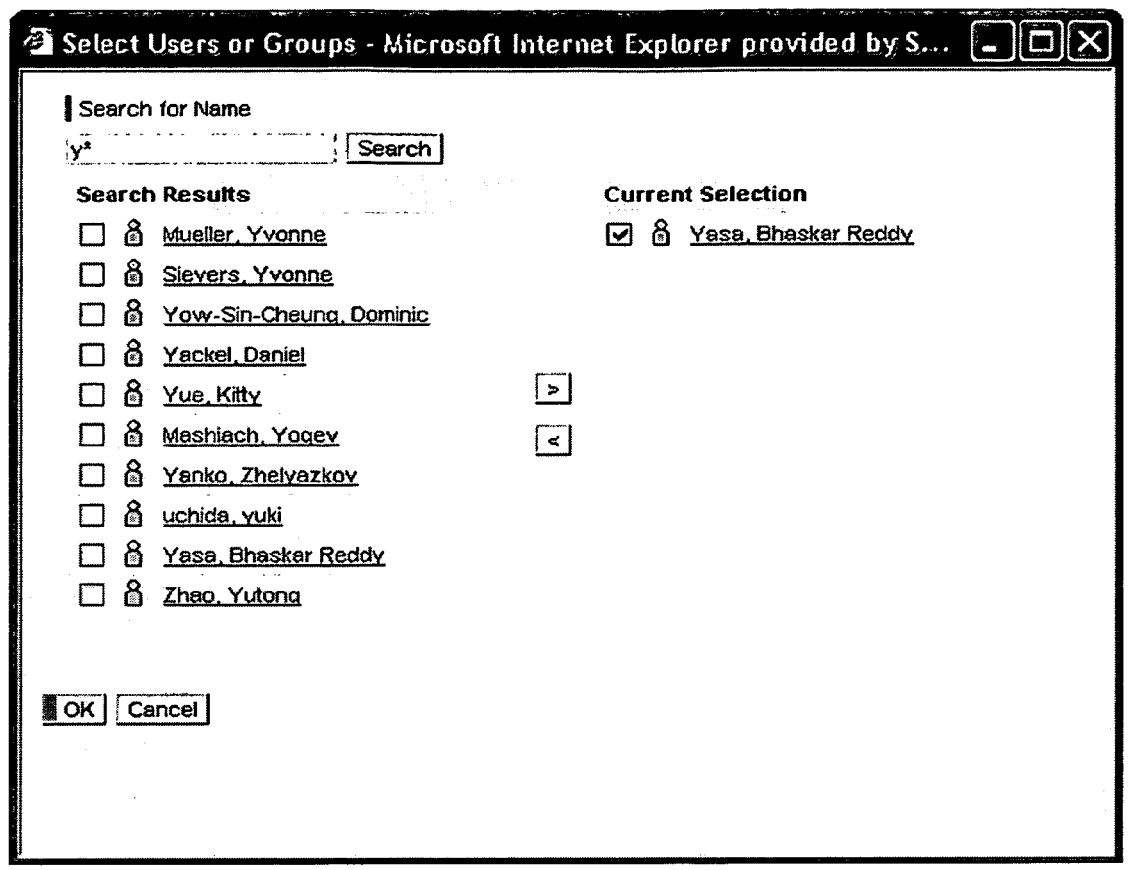

FIG. 4 illustrates the user interface 400 of FIG. 3 as a personal object is designated. to be shared with another user. In this example, record 410 is selected for distribution. By right-clicking on the record, the user interface 400 opens a menu 420 that, among other things, includes a menu command 430 to share the record with others. Selection of the share command 430 may open a dialog box 500 (FIG. 5) that permits operators to select target recipients by name or by a grouplist. Once the target recipients are selected, the system generates record copies as discussed above.

Figure 6:
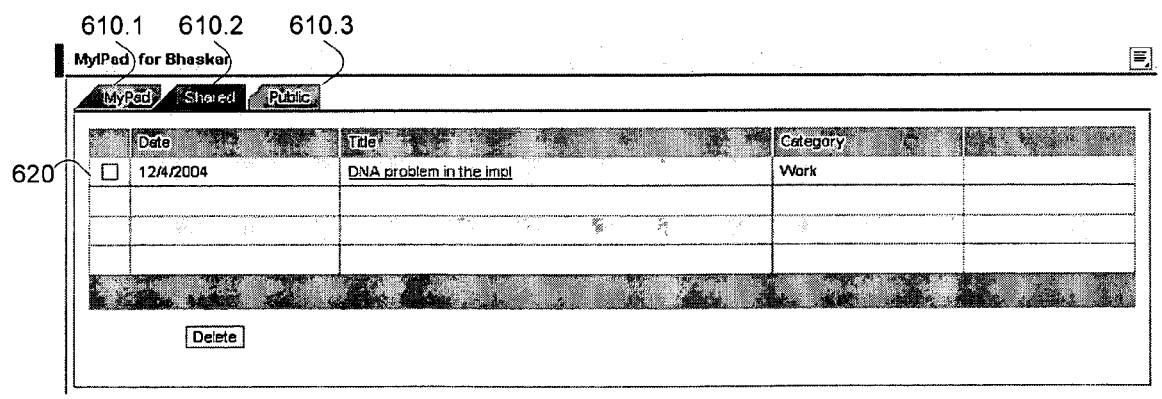

FIG. 6 is a screen shot of a user interface 600 as it may appear in a target recipient's workspace. As noted above, the user interface 600 may be the same interface that a user works with to access his own authored personal objects (see FIG. 3 above). Thus, the user interface 600 includes tabs to permit an operator to navigate to his own personal objects (tab 610.1), shared objects (tab 610.2) and public objects (tab 610.3). In this example, the record 410 from FIG. 4 was designated to be shared with this target recipient and, therefore, it appears in the user interface 600 (as record 620). The target recipient may work with the record as described above. For example, the recipient may open the record to review its contents. The recipient also may delete the record from his shared workspace (although doing so has no affect on the copy held in the author's workspace).

Figure 7:
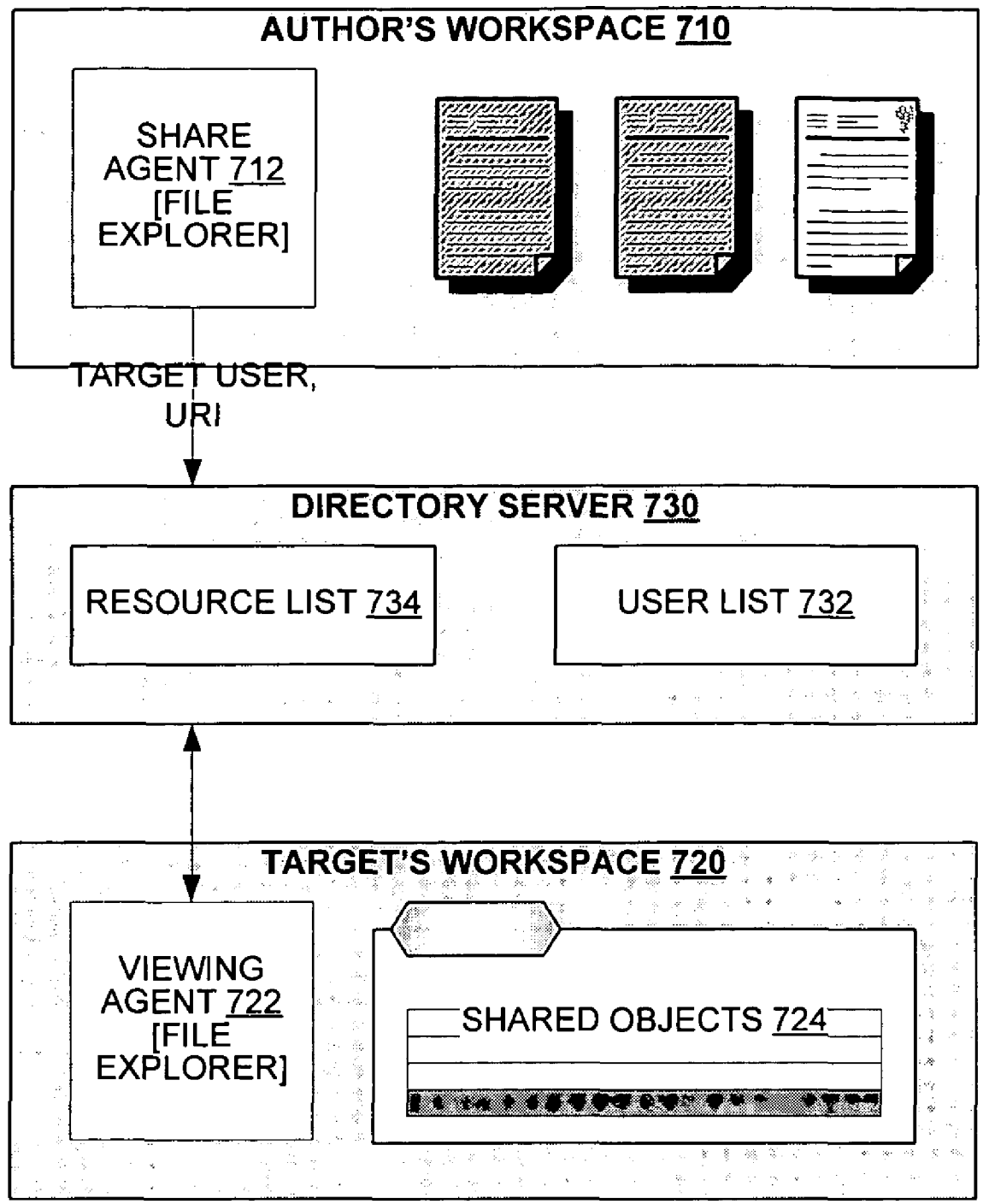
FIG. 7 is a data flow diagram illustrating operation of another embodiment of the present invention.

FIG. 7 is a data flow diagram of another embodiment of the present invention, this time being applied to a file system. In this example, various network users have personal workspaces (such as personal folders), which may or may not be accessible by other network users. For simplicity, consider an example where each user has his own private workspace ("My Workspace") that may not be viewed by other users (in other words the local file system or an area within). In this example, an author and a target recipient each have their own workspaces 710, 720 defined by network policy/file system security. For purposes of the present discussion, assume that the network uses a Lightweight Directory Access Protocol (LDAP) Server for authentication.

In a multi-user network environment, a directory server 730 typically maintains a list 732 of each user authorized to access the network. User profiles are well known for use in computer networks. They may store data regarding, for example, network resources that they user is entitled to access (an access control list or "ACL") and network preferences. Embodiments of the present invention supplement these services by establishing a network area that is dedicated to storage of data objects that are being shared by the user with other users of the network. For example, in the Microsoft Windows naming convention, each user's local file system may include a sub-folder for "Shared Documents" (or, more accurately "Shared Items"), which are provided by the user to other network users. The directory server 730 may manage such registries.

A communication flow diagram of this environment is shown in FIG. 7. There, two users' private workspaces 710, 720 are shown, along with a directory server 730. A first user (the author) wishes to share an object from his private workspace 710 with another user (the target recipient). In this example, selection of a share operation at the author's terminal causes a share agent 712 thereon (provided as a component of the file browser) to communicate a share command to the directory server 730. The share command identifies user(s) with whom an object is to be shared and includes a resource link representing the object being shared. The resource link may include, for example, universal resource identifier (URI) of the shared object and also an ACL containing the list of users with permissions to access the resource. The directors server 730 may store such information in a resource list 734.

This embodiment works cooperatively with normal authentication and desktop imaging functionality present in modern computer networks. Typically, when a network user logs onto a network from a computer terminal, a directory server transfers user-accessible resources data to the computer terminal (commonly, the user's "image"). Thus, in Microsoft Windows environments, a user may see a consistent shared resources list even when logged on from different terminals throughout an integrated network.

Whenever a target user logs in to the network and authenticates to network administration unit 730, a viewing agent 722 on the target user's machine conventionally retrieves the shared resource links accessible by the user to the machine. Pursuant to an embodiment of the present invention, the viewing agent 722 also may transfer data representing shared items. In the example of FIG. 7, we illustrate a "Shared Items" folder 724 in the target user's private workspace 720. These items contain pointers to the source objects in the author's private workspace 710, which are accessed when a target user attempts to open the shared items.

According to an embodiment, a URI may take the following structure:

TABLE 1

| FIELD | DATA TYPE | DESCRIPTION |
|---|---|---|
| URI | GUID | Universal Resource Identifier of a given shared resource |
| Timestamp | Date Time | Timestamp of Last Modification |
| Status | Integer | 1 - Available; 2 - Deleted |

Each URI entry may have an Access Control list associated with it based on the list of users/groups/Roles chosen by the person who shared the resource.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of sharing data items among clients in a computer network, the method comprising:

responsive to a share command input to a first client connected to a computer network, creating a shared object in a private workspace of a second client connected to the computer network by selecting a share command control from a menu associated with a source object in a private workspace of the first client to be shared, wherein the shared object includes a pointer to the source object in the private workspace of the first client;

presenting the shared object on a display of the second client as a selectable personal object record, the personal object record including the pointer to the source object containing data to be shared within the first client workspace;

in response to a selection of the personal object record representing the shared object, following the pointer included in the personal object record and retrieving data from the source object in the private workspace of the first client;

upon retrieval of the data from the source object, using the retrieved data to generate a copy of the source object; and presenting the copy of the source object on the display of the second client, wherein the appearance of the presented copy is the same as though the shared object was a local object stored in the private workspace of the second client.

2. The method of claim 1, wherein the creating occurs automatically without manual interaction by a user.

3. The method of claim 1, wherein the shared object is provided in a segregated area of the second client workspace that is dedicated to storage of shared items/links.

4. The method of claim 1, wherein the shared object is an item created by a groupware application.

5. The method of claim 1, wherein the shared object is a document.

6. The method of claim 1, wherein the private workspace is an area of a file system.

7. The method of claim 1, wherein the private workspace is a folder.

8. The method of claim 1, wherein the private workspace is an area of storage devoted to a groupware application.

9. A directory server-based system for a computer network, the system comprising:

storage for a plurality of client profiles of network clients, and a list of links to shared resources with each link having an identifying items shared by the respective user with other network clients, a server for executing program instructions from software modules, a share agent, which is a software module executed on the server, responsive to a share command input to a first client connected to a computer network, creating a shared object in a private workspace of a second client connected to the computer network by selecting a share command control from a menu associated with a source object in a private workspace of the first client to be shared, wherein the shared object includes a pointer to the source object in the private workspace of the first client;

presenting the shared object on a display of the second client as a selectable personal object record, the personal object record including the pointer to the source object containing data to be shared within the first client workspace;

in response to a selection of the personal object record representing the shared object, following the pointer included in the personal object record and retrieving data from the source object in the private workspace of the first client;

upon retrieval of the data from the source object, using the retrieved data to generate a copy of the source object; and presenting, on a display, the copy of the source object on the display of the second client, wherein the appearance of the presented copy is the same as though the shared object was a local object stored in the private workspace of the second client.

10. The system of claim 9, wherein the share agent occurs in a Lightweight Directory Access Protocol server.

11. The system of claim 9, wherein the universal resource identifier includes a universal resource field having a global unique identifier data type and a timestamp status field having a date time data type.

12. A computer readable medium having stored thereon computer instructions that, when executed by a client terminal connected to a computer network, cause the terminal to:

create, in response to a share command input to a first client connected to a computer network, creating a shared object in a private workspace of a second client connected to the computer network by selecting a share command control from a menu associated with a source object in a private workspace of the first client to be shared, wherein the shared object includes a pointer to the source object in a the private workspace of the first client;

presenting the shared object on a display of the second client as a selectable personal object record, the personal object record including the pointer to the source object containing data to be shared within the first client workspace;

in response to a selection of the personal object record representing the shared object, following the pointer included in the personal object record and retrieving data from the source object in the private workspace of the first client;

upon retrieval of the data from the source object, using the retrieved data to generate a copy of the source object; and presenting the copy of the source object on the display of the second client, wherein the appearance of the presented copy is the same as though the shared object was a local object stored in the private workspace of the second client.

13. The medium of claim 12, wherein the private workspaces are storage areas devoted to each client's groupware applications.

14. The medium of claim 12, wherein the private workspaces are storage areas of a file system.

* * * * *